United States Patent [19]

Chadwick et al.

[11] Patent Number: 4,659,192

[45] Date of Patent: Apr. 21, 1987

[54] MANIPULATOR WITH FOUR MIRRORS

[75] Inventors: John R. Chadwick, Wilmslow; Brian R. Moody, Darwen, both of England

[73] Assignee: Integrated Laser Systems Limited, Salford, England

[21] Appl. No.: 773,687

[22] Filed: Sep. 9, 1985

[30] Foreign Application Priority Data

Sep. 7, 1984 [GB] United Kingdom ................ 8422663

[51] Int. Cl.⁴ .......................... G02B 5/08; G02B 6/00; G02B 7/18; G02B 17/00
[52] U.S. Cl. ..................... 350/486; 350/622; 350/623; 350/574; 219/121 LU; 219/121 LQ
[58] Field of Search ............... 350/623, 622, 624, 618, 350/486, 286, 287, 574, 539, 543, 537; 219/121 LU, 121 LV, 121 LQ, 121 LW

[56] References Cited

U.S. PATENT DOCUMENTS 3,326,620  6/1967  Marie .................................. 350/573

FOREIGN PATENT DOCUMENTS 1130196  5/1962  Fed. Rep. of Germany ...... 350/539
2507346  8/1975  Fed. Rep. of Germany ...... 350/573
2754614  2/1984  Fed. Rep. of Germany ...... 350/574
260590  10/1928  Italy ..................................... 350/576
502561  3/1939  United Kingdom ................ 350/539

Primary Examiner—Jon W. Henry
Attorney, Agent, or Firm—Millen & White

[57] ABSTRACT

A coincident three axis manipulator comprises a first member which is mounted to rotate about a first axis and carries a second member which is mounted to rotate about a second axis obliquely inclined to the first axis. The second member carries a third member which is mounted to rotate about a third axis obliquely inclined to the second axis. First and second mirrors are carried by the first member and mounted to rotate with it. The first mirror is situated on the first axis and positioned to reflect a laser beam which is parallel to the first axis on to the second mirror which is on the second axis. Third and fourth mirrors are carried by the second member and mounted to rotate with it. The third mirror is situated on the second axis and positioned to reflect the laser beam reflected by the second mirror on to the fourth mirror. The fourth mirror is situated on the third axis positioned to direct the laser beam parallel to the third axis.

7 Claims, 4 Drawing Figures

MANIPULATOR WITH FOUR MIRRORS

The present invention relates to manipulators and is concerned with that type of manipulator which comprises a first member which is mounted to rotate about a first axis and carries a second member which is mounted to rotate about a second axis obliquely inclined to the first axis, the second member carrying a third member which is mounted to rotate about a third axis obliquely inclined to the second axis, the first, second and third axes preferably passing through a single point.

A manipulator of this general type is disclosed in British Patent No. 1565730 and is commonly referred to as a coincident three axis manipulator or wrist. The third member, which may be termed an end effector, may carry a tool or the like and by effecting selective rotation about one or more of the axes of rotation the tool carried by the end effector may be brought into any desired position and orientation. Such manipulators are thus particularly suitable for use in remote handling apparatus or robots.

It is sometimes desirable to be able to steer a beam of electromagnetic radiation to any desired point in a manner similar to that in which a tool may be moved by such a manipulator, either alone or at the same time as a tool. Thus, it may be desirable either to heat treat or to weld a work piece using a laser beam during an operation which includes the use of a tool carried by a manipulator of the type referred to above. The tool may be brought to the required position by virtue of the various axes of rotation provided within the manipulator and it is an object of the present invention to provide such a manipulator in which a beam of electromagnetic radiation, such as a laser beam, may be transmitted through such a manipulator and directed to any desired position regardless of the relative orientations of the various relatively moveable members.

According to the present invention, a manipulator of the type referred to above includes first and second mirrors carried by the first member and mounted to rotate therewith, the first mirror being situated on the first axis and positioned to reflect a beam of electromagnetic radiation which is substantially parallel to the first axis onto the second mirror which is situated on the second axis, and third and fourth mirrors carried by the second member and mounted to rotate therewith, the third mirror being situated on the second axis and positioned to reflect the beam of radiation reflected from the second mirror onto the fourth mirror, and the fourth mirror being situated on the third axis and positioned to direct the beam of radiation substantially parallel to the third axis.

Thus, in the manipulator of the present invention the beam of radiation enters parallel to and preferably coincident with the first axis and always leaves the manipulator parallel to and preferably coincident with the third axis regardless of the relative angular positions of the various members. The third member or or end effector may carry additional optical elements, for instance a mirror on which the beam of radiation is incident and which is inclined to the third axis. Alternatively, it may carry a tool thereby permitting the work piece on which the tool has performed or is about to perform an operation to be heat treated or to be welded, though in the latter case one or more focussing lenses or mirrors will additionally be required to focus the beam of radiation down to the required area.

In the preferred construction the first and second mirrors are connected to a common carrier which is releasably carried by the first member. Similarly, it is preferred that the third and fourth mirrors are also connected to a common carrier which is releasably carried by the second member. Thus, whilst the manipulator may, of course, include additional optical elements for the purpose of conducting the beam of radiation through it, it is preferred that it includes only four mirrors and that these are associated in pairs and rigidly connected to two common carriers whereby all the mirrors may be removed from the manipulator for cleaning or replacement only by removing the two carriers.

It will be appreciated that, depending on the precise operation which the manipulator is to perform, the various members of the manipulator may be moved to the required relative angular positions manually. It is, however, preferred that the manipulator includes drive means arranged to rotate at least one of the first, second and third members about its respective axis. The drive means may take one of many known forms of appropriate drive means but in the preferred embodiment the manipulator includes a rotationally fixed base member carrying the first member and first annular drive means disposed around the first axis and between the base member and the first member to rotate the first member. The first drive means is preferably accommodated within a substantially enclosed space defined by the base member and the first member. Similarly, the manipulator preferably also includes second annular drive means disposed around the second axis and between the first and second members to rotate the second member and/or third annular drive means disposed around the third axis and between the second and third members to rotate the third member. In each case, the drive means is preferably accommodated in a substantially enclosed space defined by the two members to which it is arranged to impart relative rotation.

Further features and details of the present invention will be apparent from the following description of one particular embodiment which is given by way of example only with reference to the accompanying drawings in which.

Figure 1:
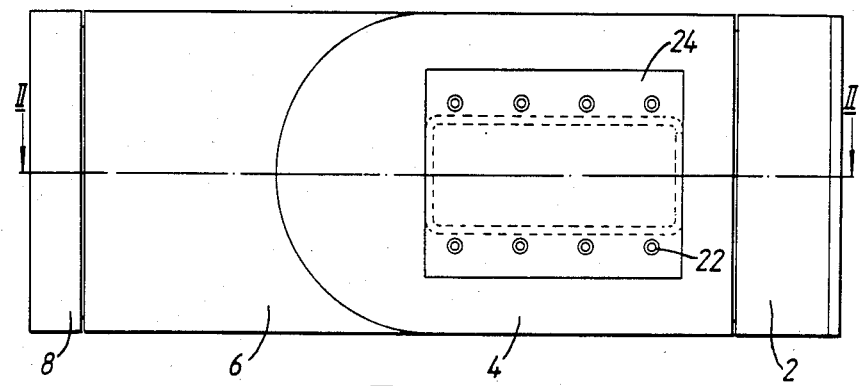
FIG. 1 is an underplan view of a manipulator in accordance with the invention.

The manipulator comprises a rotationally fixed base member 2 which carries a first member 4 which in turn carries a second member 6 which in turn carries a third member or end effector 8. The base member 2 and the first member 4 together define a cylindrical space which accommodates an annual drive means and gearing which is designated 10. The drive means and gearing 10 connect the members 2 and 4 and is arranged to rotate the member 4 with respect to the member 2 about an axis 12. Similarly, the second member 6 is connected to the first member 4 by a further annular drive means and gearing 14 which is accommodated in a cylindrical space enclosed by the first and second members and which is arranged to rotate the second member 6 with respect to the first member 4 about a second axis 16 which is obliquely inclined to the first axis by about 120°. Similarly, the third member 8 is connected to the second member 6 by a third annular drive means and gearing 18 which is accommodated in a cylindrical space defined by the second and third members and is arranged to rotate the third member 8 about a third axis 20 with respect to the second member. The drive means 10, 14 and 18 are of generally conventional construction and are thus not described in detail and are illustrated only diagrammatically.

Connected to the first member 4 by a plurality of screws 22 is a common carrier or cassette 24 to which a first mirror 26 and a second mirror 28 are rigidly connected. The first mirror is situated on the first axis 12 and positioned to reflect a beam of radiation coincident with the axis 12 onto the second mirror 28 which is positioned on the second axis 16.

Similarly, the second member 6 carries a removeable carrier or cassette 30 to which a third mirror 32 and a fourth mirror 34 are rigidly connected. The third mirror 32 is positioned so that the beam of radiation reflected from the second mirror 28 is incident on it and then reflected onto the fourth mirror 34 which in turn is so positioned that the beam of radiation incident on it is reflected in a direction which is parallel to and preferably coincident with the third axis 20.

Figure 2:
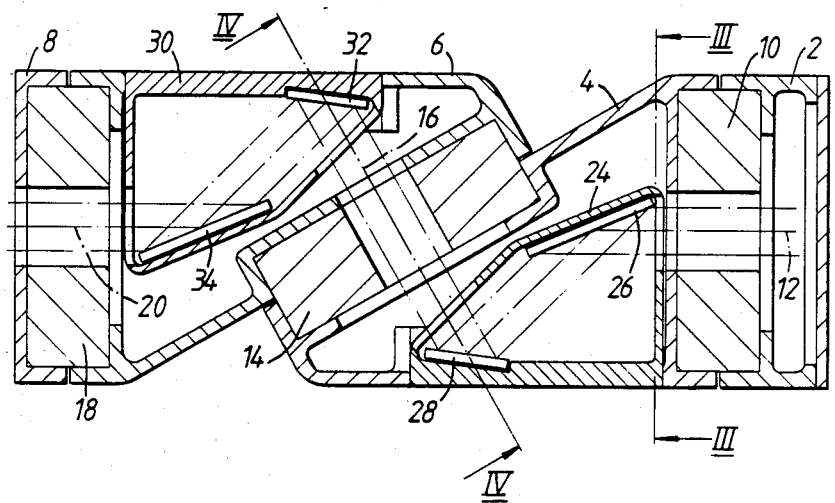
FIG. 2 is a sectional elevation on the line II—II in FIG. 1.
Figure 3:
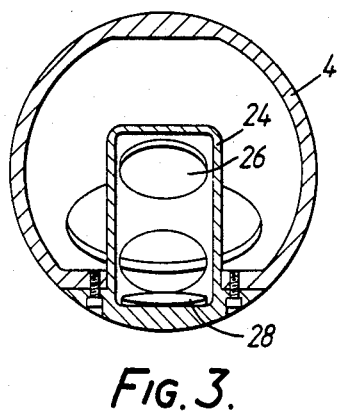
FIG. 3 is a sectional view on the line III—III in FIG. 2.
Figure 4:
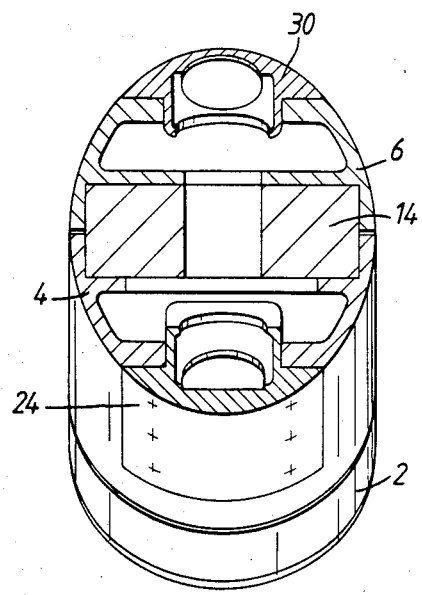
FIG. 4 is a sectional view on the line IV—IV in FIG. 2.

As is best seen in FIG. 2, the various members 2, 4, 6 and 8 and the cassettes 24 and 30 are provided with appropriate holes whereby a beam of radiation whose axis is coincident with the first axis 12 is incident on the first mirror and then reflected to the second, third and fourth mirror and then leaves the manipulator along the third axis.

By appropriately rotating the first, second and third members, a beam of radiation may be directed in any desired direction and, more importantly, may be directed and optionally focussed onto a work piece on which a tool which may be carried by the end effector has performed or will perform an operation. In this preferred embodiment various drive means are electrically activated and controlled and it will be appreciated that each of them may be controlled by manual signals. However, in this case the drive means are connected to a common logic unit, ie. a computer, which is appropriately programmed so that the beam of radiation may be automatically directed to any number of desired locations in a desired sequence.

Thus, the construction of the present invention enables a laser beam to be transmitted through a coincident three axis wrist in a manner which enables the mirrors, of which only four are required, to be rigidly mounted to respective portions of the wrist without the need for providing for compensating angular movement of each mirror. The construction of the present invention is, thus, both simple and inexpensive to manufacture.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the Unites States is:

1. A manipulator comprising a first member which is mounted to rotate about a first axis, a second member which is carried by said first member and mounted to rotate about a second axis obliquely inclined to said first axis, a third member which is carried by said second member and mounted to rotate about a third axis obliquely inclined with respect to said second axis and an optical system to transmit a laser beam through said manipulator, said optical system comprising, first and second mirrors carried by said first member and mounted to rotate therewith, said first mirror being situated on said first axis and positioned to reflect a beam of electromagnetic radiation which is substantially parallel to said first axis directly onto said second mirror which is situated on said second axis and third and fourth mirrors carried by said second member and mounted to rotate therewith, said third mirror being situated on said second axis and positioned to reflect said beam of radiation reflected directly from said second mirror directly onto said fourth mirror and said foruth mirror being situated on said third axis and positioned to direct said beam of radiation substantially parallel to said third axis, said first, second and third axes each passing through the same point.

2. A manipulator as claimed in claim 1 including a first common carrier to which said first and said second mirrors are connected and which is releasably carried by said first member.

3. A manipulator as claimed in claim 1 including a second common carrier to which said third and said fourth mirrors are connected and which is releasably carried by said second member.

4. A manipulator as claimed in claim 1 including drive means arranged to rotate at least one of said first, second and third members abouts its respective axis.

5. A manipulator as claimed in claim 1 including a rotationally fixed base member carrying said first member and first annular drive means disposed around said first axis and between said base member and said first member to rotate said first member.

6. A manipulator as claimed in claim 5 including second annular drive means disposed around said said axis and between said first and second members to rotate said second member.

7. A manipulator as claimed in claim 5 including further annular dirve means disposed around said third axis and between said second and third members to rotate said third member.

* * * * *